Figure 1:
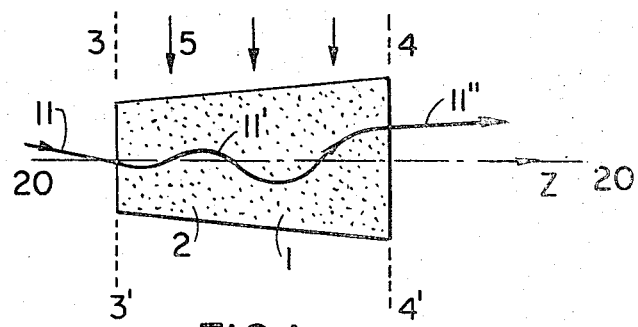

United States Patent

[11] 3,617,917

| [72] | Inventor | Teiji Uchida<br>Tokyo, Japan |
| --- | --- | --- |
| [21] | Appl. No. | 877,238 |
| [22] | Filed | Nov. 17, 1969 |
| [45] | Patented | Nov. 2, 1971 |
| [73] | Assignee | Nippon Selfoc Company, Limited<br>Tokyo, Japan |
| [32] | Priority | Nov. 16, 1968 |
| [33] | | Japan |
| [31] | | 43/83,672 |

[54] CONVERGING SOLID-STATE LASER ELEMENT FOR HIGH-POWER OUTPUT USE
1 Claim, 2 Drawing Figs.

[52] U.S. Cl. .................................................... 330/4.3,
350/96 R, 350/175 GN, 331/94.5
[51] Int. Cl. .................................................... H01s 3/00
[50] Field of Search ........................................... 350/96, 96
B, 96 WG, 175 GN; 330/4.3; 331/94.5

[56] References Cited
UNITED STATES PATENTS

| 3,083,123 | 3/1963 | Navias | 350/175 GN X |
| --- | --- | --- | --- |
| 3,320,114 | 5/1967 | Schulz | 350/96 X |
| 3,372,972 | 3/1968 | Schmidt et al. | 350/160 |
| 3,434,774 | 3/1969 | Miller | 350/96 WG X |
| 3,533,013 | 10/1970 | Seitz | 331/94.5 |

OTHER REFERENCES

Miller Article in Bell System Technical Journal Vol. 44 No. 9 Nov. 1965 pgs. 2017– 2030 cited copy in 350/96 (WG)
Kawakami et al. Article in Proceedings of the IEEE Dec. 1965 pgs. 2148 and 2149 cited copy in 350/96 (WG)

*Primary Examiner*— David H. Rubin
*Attorney*— Sandoe, Hopgood & Calimafde

ABSTRACT: A converging laser element having an index of refraction distribution of $n=N(1-\frac{1}{2}ar^2)$ is disclosed wherein at least $N$ or $a$ varies along the axis of the element. As a result, the spot size at the output end of the element can be made greater than the incident spot size at the input end surface.

(a)

(b)

INVENTOR
Teiji Uchida

CONVERGING SOLID-STATE LASER ELEMENT FOR HIGH-POWER OUTPUT USE

The present invention relates to a solid-state laser element and, more particularly, to an improved rod or fiberlike solid-state laser element having light-converging capability whose refractive index observed in the plane normal to its axis is highest at the axis and gradually decreases toward the surface.

Solid-state lasers for continuous oscillation use have recently been developed, in which the output power obtained is as high as that obtained from conventional gas lasers. A solid-state laser element of this kind is disclosed in a copending application Ser. No. 839,428, entitled Solid-State Laser Element, filed on July 7, 1969 and assigned to the assignee of the present application is in the form of a thin glass laser element in which the refractive index distribution observed in the plane normal to the axis is highest at the axis and gradually decreases toward the surface. An activating oxide is doped in at least a portion of the total length of the element.

More specifically, a glass laser element of this type has a refractive index distribution given approximately by the expression:

$$n = N(1 - \tfrac{1}{2}ar^2), \quad (1)$$

where $N$ is the refractive index at the axis of the element; $r$ is the radial distance from the axis; $a$ is a constant; and $n$ is the refractive index at a distance $r$ measured from the axis.

In a cylindrical medium having the above refractive index distribution, a light beam incident upon one of its end surfaces at an angle to the axis smaller than a certain threshold value is transmitted therethrough in the axial direction oscillating about the axis, without deviating from the medium. An analysis of this subject is given in an article by S. E. Miller, published at pages 2017–2064 of "The Bell System Technical Journal," vol. 44. No. 9 (Nov. 1965). In this glass laser element containing the laser-activating ions, hereinafter referred to as a converging glass laser element, there is no difference in the optical path length between the light beams, even when a laser rod having a small cross section is used. In other words, the phase velocities between the light beams transmitted through the laser element are equal. Thus, an ultrahigh speed light pulse train can be amplified without distortion when a laser amplifier is formed of a converging glass laser element.

Furthermore, when the converging glass laser element is subjected to the optical excitation necessary for achieving oscillation and amplification, the excitation light rays irradiating the element from the periphery of the element are concentrated onto the axial portion of the element, as a result of the above-defined refractive index distribution. Since the laser light beam generated by the element through the excitation light travels therethrough in the axial direction oscillating about the axis, the efficiency of the excitation is quite high.

As will be seen from the foregoing, the converging glass laser element is equivalent to a medium having the refractive index distribution defined in equation (1). Therefore, according to the analysis given in the Miller article, the spot sizes $W$ (diameter) of the input and output light beams of the fundamental mode are given by $$W = \left(\frac{\lambda_o}{\pi N}\right)^{1/2} \cdot a^{-1/4} \quad (2)$$

where $\lambda_o$ is the wavelength of light in free-space.

A light beam having a spot size defined by equation (2) incident upon the converging glass laser element is amplified and arrives at the output end surface with the same spot size. Since the power of the light beam is limited by its spot size, the intensity of the laser output is also limited. In other words, saturation occurs in the vicinity of the output end surface.

It is therefore an object of the present invention to provide a glass laser element capable of producing a higher laser output.

It is a further object of the present invention to provide a laser element of the type described in which the spot size of the light beam at the output end surface is greater than the spot size at the input end surface.

According to the invention, a converging glass laser element having a refractive index distribution defined by equation (1), that is, $n = N(1 - \tfrac{1}{2}ar^2)$, is provided, wherein at least one of $N$ and $a$ exhibits a monotonic change along the axis of the element. Since at least either $N$ or $a$ varies along the axis, the spot size at the output end surface of the converging glass laser element is different from that at the input end surface.

Furthermore, since the degree of saturation of the laser output observed in the vicinity of the output surface depends on the light power density, the larger spot size at the output end allows for higher output power without saturation.

Figure 2:
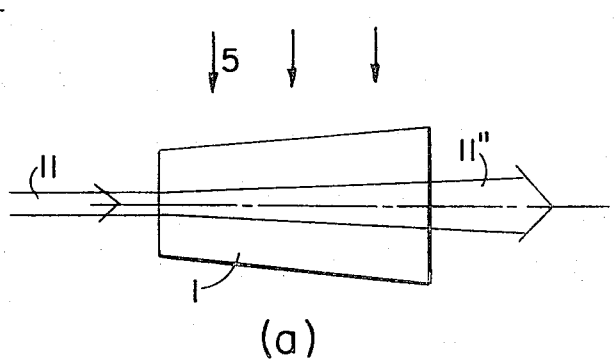
Figure 2:
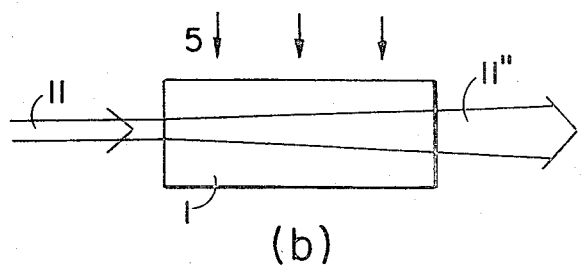

To the accomplishment of the above and to such further objects as may hereinafter appear, the present invention relates to a converging solid-state laser element as defined in the appended claims, and described in the following specification taken together with the accompanying drawings in which:

FIG. 1 is a longitudinal cross-sectional view of the solid-state laser element of the invention illustrating the relation between the input, output and excitation light beams within the element; and FIG. 2 schematically shows the variation of the spot size of the light beams transmitted through the laser element of FIG. 1.

Referring to FIG. 1, a glass laser element 1 of the present invention is shown in the shape of an elongated truncated cone having parallel end surfaces 3–3' and 4–4' normal to the longitudinal axis 20–20' of the element. Defining a system of cylindrical coordinates, where the z axis is determined along the axis 20–20' in a direction from end surface 3–3' to end surface 4–4', the refractive index $n$ at an arbitrary point defined by the coordinates $(r,z)$, of the glass laser element 1 is approximately given by the expression $$n(r,z) = N(z)[1 - a(z)r^2], \quad (3)$$

where $z$ is a position on the axis 20–20', $r$ is the radial distance from the axis; $N(z)$ is the refractive index at a point $z$ on the axis; and $a(z)$ is a positive constant determined only by the coordinate $z$. Moreover, it is assumed that both $N(z)$ and $a(z)$ monotonically decrease as $z$ increases.

The reference numeral 2 denotes the laser-activating ions necessary for sustaining laser oscillation which may be, for example, neodymium ion $Nd^{3+}$ and a sensitizer, which may be, for example, uranium ion $U^{4+}$, which are uniformly distributed in the glass laser element 1.

If a light beam such as 11 is incident upon the input end surface 3–3' at a point as shown in FIG. 1, the spot size of this light beam is made approximately equal to the specific spot size determined by the refractive index distribution at the input end surface 3–3'.

Since laser element 1 has a converging action due to the refractive index distribution defined by equation (3) or, in other words, due to the high-refractive index at the axis and thus rather low refractive index at the outer periphery of the element, the incident light beam 11 is axially transmitted through the element and oscillates about the axis.

Also, the refractive index of the glass laser element 1 decreases in the z axis direction. The converging action is therefore weakened as the laser beam travels toward the right in FIG. 1 along the z axis. Therefore, the cross-sectional area of the light beam is enlarged as it approaches the output end surface 4–4', as shown by reference numeral 11' in FIG. 1. However, since the refractive index distribution is given along the z axis as has been described above, so that the light beam does not deviate from the periphery of the element 1, the light beam incident upon the input end surface 3–3' is transmitted therethrough, as shown by 11' in FIG. 1, oscillating about the axis and colliding with the laser-active material 2, and then emerges from the output end surface 4–4'. With the exciting light beam 5 concentrated on the glass laser element 1, the input light beam emerges from the element 1 as the output beam 11".

More specifically, since $a(z)$ and $N(a)$ of the glass laser element of the invention decrease monotonically as $z$ increases, the spot sizes $W_i$, $W_o$ at the input and output end surfaces respectively, are given according to the equations (2) and (3) by the expressions $$W_i = \left(\frac{\lambda_o}{\pi N_o}\right)^{1/2} \cdot a_i^{-1/4} \quad (4)$$

and $$W_o = \left(\frac{\lambda_o}{\pi N_o}\right)^{1/2} \cdot a_o^{-1/4} \quad (5)$$

or $$W_i = \left(\frac{\lambda_o}{\pi N_o}\right)^{1/2} \cdot \left(\frac{1 - n/N_i}{r^2}\right)^{-1/4} \quad (6)$$

and $$W_o = \left(\frac{\lambda_o}{\pi N_o}\right)^{1/2} \cdot \left(\frac{1 - n/N_o}{r^2}\right)^{-1/4} \quad (7)$$

where $a_i$ and $N_i$, and $a_o$ and $N_o$ denote $a(z)$ and $N(z)$ at the input and output end surfaces, respectively; and $n = n(r,z)$. Since the relations $a_i > a_o$ and $N_i > N_o$ holds, an inequality $W_o > W_i$ also holds. Thus, the spot size at the output end surface is apparently large as compared with that at the input end surface.

As a result, the saturation value determined by the power density of the light beam at the output end surface 4-4' can be increased to obtain a relatively larger output power than could be obtained in the prior art laser elements of this type.

FIG. 2(a) schematically shows the broadening of the spot size of the laser element of the invention. Although it has been assumed that both $a(z)$ and $N(z)$ decrease monotonically with $z$, it is obvious from equations 4, 5, 6 and 7, that the same effect can be obtained even in the case where only one of $a(z)$ and $N(z)$ decreases with $z$.

Also, the shape of the laser element may be other than an elongated truncated cone. A cylindrical shape for the laser element for example, as shown in FIG. 2(b), may be effective if only one of $a(z)$ and $N(z)$ decreases with $z$. Although the host material of the laser element is assumed to be glass in the above description, any suitable transparent material such as plastic, can be used instead of glass to form the element.

As is obvious from the above description, according to the present invention, a glass laser element capable of producing a high power output can be realized.

While only several embodiments of the invention have been herein specifically described, it will be apparent that modifications may be made therein without departing from the spirit and scope of the invention.

I claim:

1. A solid-state laser element comprising a transparent body of host material including laser-active material substantially uniformly distributed in at least a portion of its entire axial length, said element having an input and an output surface, wherein the refractive index $n$ of the host material at a point of distance $r$ from the axis of said body is defined substantially by an expression $n = N(1 - \frac{1}{2}ar^2)$, where $N$ is the refractive index at said axis, and $a$ is a positive proportional coefficient decreasing monotonically along said axis from said input surface to said output surface.